United States Patent

Lipinski et al.

[11] Patent Number: 5,813,714
[45] Date of Patent: Sep. 29, 1998

[54] TAILGATE AND RAMP ASSEMBLY

[75] Inventors: Paul Lawrence Lipinski, Plymouth; Terrance Dean Savitsky, Dearborn; Stacey Ann Boersma, Livonia, all of Mich.

[73] Assignee: Ford Global Technologies, Inc., Dearborn, Mich.

[21] Appl. No.: 784,330

[22] Filed: Jan. 16, 1997

[51] Int. Cl.⁶ ........................................... B60P 1/43
[52] U.S. Cl. ............................................. 276/61; 414/537
[58] Field of Search .............................. 296/57.1, 50, 61, 296/62, 26, 51; 414/537

[56] References Cited

U.S. PATENT DOCUMENTS

| | | | |
|---|---|---|---|
| 1,006,025 | 10/1911 | Taylor | 414/537 X |
| 3,510,015 | 5/1970 | Roshaven | 296/61 X |
| 4,021,071 | 5/1977 | Norman | 296/62 |
| 4,098,414 | 7/1978 | Abiera | 414/537 |
| 4,191,388 | 3/1980 | Barksdale | 296/62 X |
| 5,199,150 | 4/1993 | Mortenson | 414/537 X |
| 5,211,437 | 5/1993 | Gerulf | 296/61 |
| 5,518,286 | 5/1996 | McCormack | 296/57.1 |

FOREIGN PATENT DOCUMENTS 1071811  2/1980  Canada ................................. 414/537

*Primary Examiner*—Dennis H. Pedder
*Attorney, Agent, or Firm*—Daniel M. Stock

[57] ABSTRACT

A combination tailgate and ramp assembly is provided for a pickup truck which includes a tailgate 28, a ramp 52, anchor means 32 in the form of a laterally extending anchor rod 44 accessible through a pair of windows 46, 48 in the tailgate 28 and mounting members 58, 60 pivotally engagable with the anchor rod 44 to provide a ramp surface to the inner surface 42 of the tailgate 28 upon insertion of the mounting members 58, 60 into pivotal engagement with the anchor rod 44.

1 Claim, 1 Drawing Sheet

TAILGATE AND RAMP ASSEMBLY

BACKGROUND OF THE INVENTION

1. Technical Field

The present invention relates to tailgate and ramp assemblies, and more particularly to such assemblies in which joining of tailgate and ramp is easily and effectively accomplished with a minimum of parts.

2. Description of Related Art

It is known to provide a combination tailgate and ramp assembly. U.S. Pat. No. 5,211,437 is exemplary of such assemblies. However, the prior art assemblies are generally not readily adapted to conventional vehicle construction and necessitate the use of special hinge pin and the like. They may also present difficulties in disassembling the ramp fully from the pick-up truck when its use is not desired.

SUMMARY OF THE INVENTION

Responsive to the deficiencies of the prior art, the present invention provides a simply economic tailgate and ramp assembly which utilizes structure formed in the vehicle tailgate for other load supporting purposes.

According to the invention, a tailgate and ramp assembly is provided for a pickup truck in which the tailgate includes an outer surface facing external of the truck an inner surface facing internal the truck, anchor means provided within the tailgate inner and outer surfaces and accessible from the tailgate surface and a ramp pivotally mountable on the anchor means.

According to one feature of the invention, the tailgate and ramp assembly includes at least one mounting member carried on an edge of the ramp that is adapted to pivotally engage the anchor means of the tailgate.

BRIEF DESCRIPTION OF THE DRAWINGS

Other advantages and features of the tailgate construction of the present invention will be apparent to those skilled in the automotive vehicle arts upon reading the following description with reference to the accompanying drawings, in which.

DESCRIPTION OF THE PREFERRED EMBODIMENTS

Figure 1:
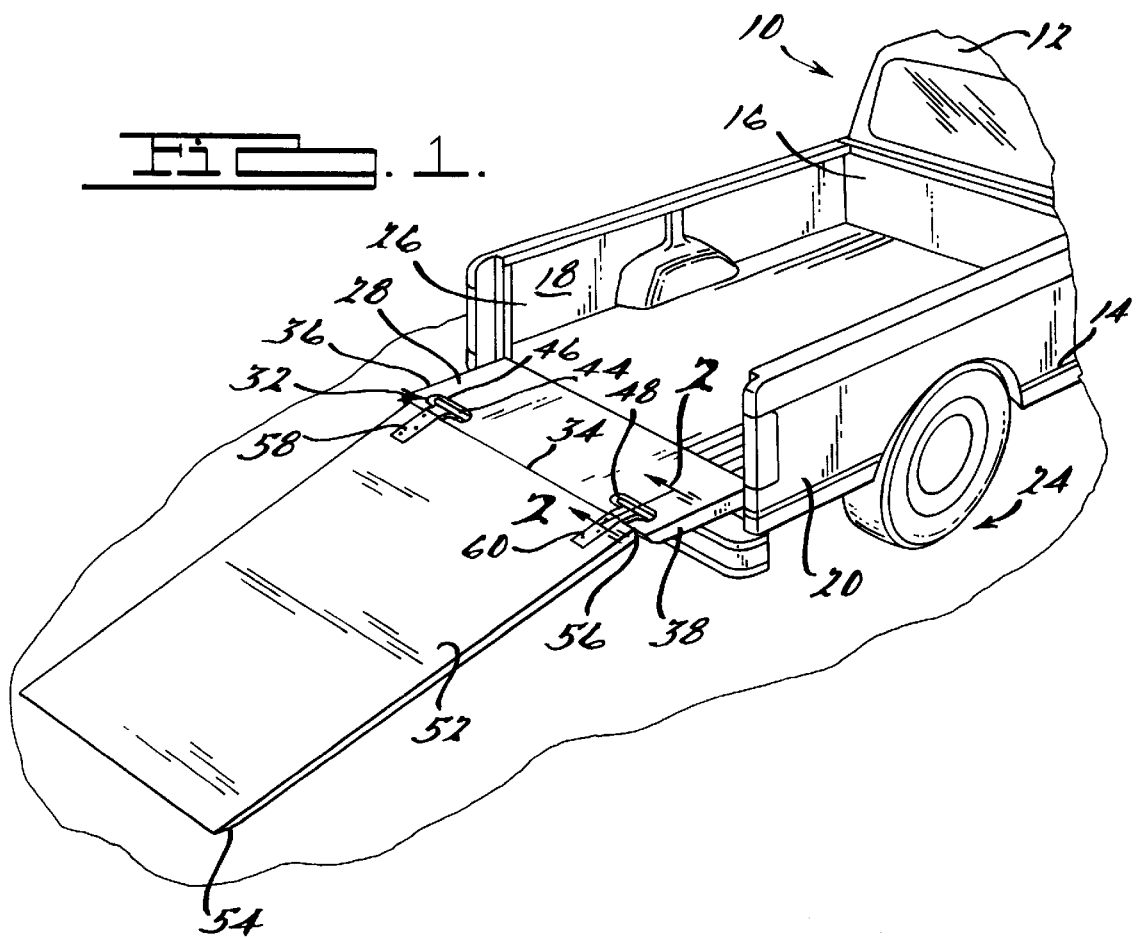
FIG. 1 is a rear respective view of a tailgate and ramp assembly according to the present invention.

Turning now to the drawings, particularly to FIG. 1 thereof, a pickup truck 10 is illustrated as including a cab 12, having a load box 14. The load box 14 is illustrated as having a front terminal wall 16 adjacent the rear of the cab 12. A pair of laterally spaced sidewalls 18, 20 extends rearwardly from the panel 16. A bed floor 22 extends laterally between the side walls and extends axially coextensively with them. The load box 14 is supported in conventional manner on the chassis of the pick-up truck indicated generally at 24. The opening 26 at the rear termination of the side walls 18, 20 this selectably closable by a tailgate 28 according to the present invention. The tailgate 28 is preferably pivotally mounted to the side walls 18, 20 about an axis approximate its slower edge indicated at 30 in FIG. 1. This pivotal mounting is well known in the art and further description is deemed unnecessary. Anchor means indicated generally at 32 is positioned proximate the upper edge 34 of the tailgate 28.

The tailgate 28 further includes side portions 36, 38 and includes an outer surface 40 facing external of the vehicle and an inner surface 42 that faces internal of the load box 14 of pickup truck 10 when the tailgate is in the upright position of FIG. 3.

The anchor means 32 is preferably formed as a rod 44 extending laterally between side portions 36, 38 of the tailgate 28. If the tailgate 28 is formed stampings or moldings defining box sections, the side portions 36, 38 may be in the form of rails and the rod 44 may be fixedly secured to each of them. Various other mechanical expedients for supporting the rod 44 between the side portion 36 and 38 may also be possible.

According to a preferred embodiment, a pair of windows 46, 48 are formed through the inner surface 42 of the tailgate 28 in registration with the rod 44 to permit access to the rod from the inner side of the tailgate 28.

Figure 2:
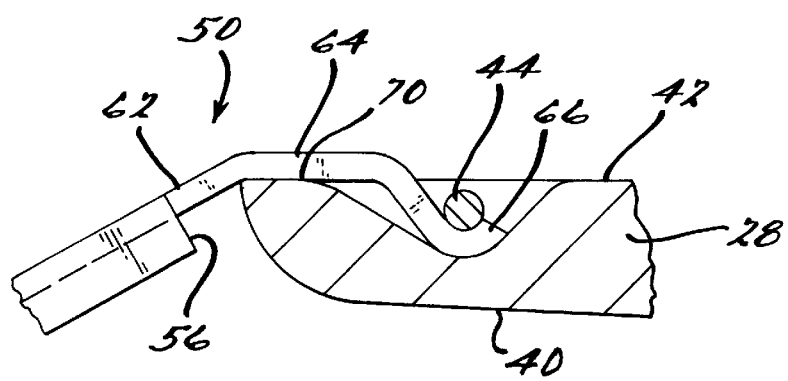
FIG. 2 is an enlarged cross sectional view of a portion of the tailgate ramp assembly taken along line 2—2 of FIG. 1.

Turning now to FIG. 2, a simple tailgate and ramp assembly indicated generally at 50 is shown which utilizes the construction of the tailgate 28 heretofore described. Tailgate ramp assembly 50 consists generally of tailgate 28 and a ramp 52 pivotally mounted on the anchor means 32 of the tailgate 28. The ramp 52 has a ground engaging end 54 and a mounting end 56. The mounting end 56 is illustrated as including a pair of mounting members 58, 60 fixedly secured to the ramp 52 and each having a mounting plate 62 having a support portion 64 and a hook portion 66. The hook portion 66 is pivotally engagable with the rod 44 upon insertion through a window 46 or 48, and support portion 64 there is against a flat portion 68 of the inner surface 42 of the tailgate 28. With this construction, a simple ramp and tailgate assembly 50 is provided in which tongue-like mounting members 58, 60 of ramp 52 project from the mounting end 56 of the ramp 52 and are insertable into the windows 46, 48 so that hook portions 66 pivotally engage the rod 44 with swingable movement with respect thereto. The profiled configuration of the mounting member 58, 60, that is the angular relationship between the mounting portion 62, the support portion 64 and the hook portion 66 is arranged so that excessive downward pivoting of the ramp 52 is resisted by the surface 70 of the tailgate inner surface 42 assisting in the support of the loads to be transported up the ramp into the load bed 14 of the pickup truck 10.

While only certain embodiments of the present invention are disclosed, others may be possible without departing from the scope of the following claims.

We claim:

1. A tailgate and ramp assembly for a truck having a pair of laterally spaced side walls extending rearwardly from a cab, terminating in rear ends and joined by a laterally extending bed floor, the tailgate being pivotally mounted with respect to the side walls for movement between a vertical closed position and a horizontal open position, and comprising:

an outer surface facing external of the truck;

an inner surface facing internal of the truck;

anchor means comprising at least one rod member mounted between the tailgate inner surface and the tailgate outer surface and accessible from the tailgate inner surface;

a ramp pivotally mountable on the anchor means; and at least one mounting member carried on one edge of the ramp and projecting outwardly from the one edge and adapted to pivotally engage the anchor means, said at least one mounting member further comprising a hook portion pivotally engageable with the at least one rod member and a support portion supportively engagable against the tailgate inner surface.

* * * * *